US 9,998,966 B2

(12) United States Patent
Morita et al.

(10) Patent No.: US 9,998,966 B2
(45) Date of Patent: Jun. 12, 2018

(54) COMMUNICATION TERMINAL, COMMUNICATION APPARATUS, AND COMMUNICATION SYSTEM

(71) Applicant: Panasonic Intellectual Property Corporation of America, Torrance, CA (US)

(72) Inventors: Junichi Morita, Tokyo (JP); Naganori Shirakata, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days. days.

(21) Appl. No.: 15/445,448

(22) Filed: Feb. 28, 2017

(65) Prior Publication Data

US 2017/0265112 A1    Sep. 14, 2017

(30) Foreign Application Priority Data

Mar. 9, 2016   (JP) ................. 2016-046005

(51) Int. Cl.
| | |
|---|---|
| *H04B 10/00* | (2013.01) |
| *H04W 36/08* | (2009.01) |
| *H04B 10/116* | (2013.01) |
| *H04W 36/00* | (2009.01) |
| *H04W 84/12* | (2009.01) |

(52) U.S. Cl.
CPC ......... *H04W 36/08* (2013.01); *H04B 10/116* (2013.01); *H04W 36/0055* (2013.01); *H04W 36/0077* (2013.01); *H04W 84/12* (2013.01)

(58) Field of Classification Search
CPC ............ H04W 36/08; H04W 36/0055; H04W 36/0077; H04W 84/12; H04B 10/116
USPC ............................................ 398/131
See application file for complete search history.

(56) References Cited

U.S. PATENT DOCUMENTS

| | | | | |
|---|---|---|---|---|
| 9,295,089 B2 * | 3/2016 | Chitrapu | ............... | H04W 72/12 |
| 2009/0233602 A1 * | 9/2009 | Hughes | ................ | H04W 36/00 |
| | | | | 455/436 |
| 2016/0330077 A1 * | 11/2016 | Jin | ...................... | H04L 41/0806 |

FOREIGN PATENT DOCUMENTS

| | | |
|---|---|---|
| JP | 2005-175932 A | 6/2005 |
| JP | 2005-341254 A | 12/2005 |

* cited by examiner

*Primary Examiner* — Juan A Torres
(74) *Attorney, Agent, or Firm* — Seed IP Law Group LLP

(57) ABSTRACT

A communication terminal includes visible-light reception circuitry, handover control circuitry and millimeter-wave communication circuitry. The visible-light reception circuitry, which in operation, receives visible-light data from a first communication apparatus. The handover control circuitry, which in operation, sets the first communication apparatus as a handover destination in accordance with the visible-light data. The millimeter-wave communication circuitry, which in operation, performs communication using a millimeter-wave band frequency with the first communication apparatus.

14 Claims, 4 Drawing Sheets

COMMUNICATION TERMINAL, COMMUNICATION APPARATUS, AND COMMUNICATION SYSTEM

BACKGROUND

1. Technical Field

The present disclosure relates to a communication terminal, a communication apparatus, and a communication system that perform handover.

2. Description of the Related Art

Recently, with the increase in volume of wirelessly exchanged data, an increase in data exchange speed of wireless LANs has also been accelerated. The Institute of Electrical and Electronics Engineers (IEEE) 802.11ad that is a standard for millimeter-wave wireless communication (for example, in a 60 GHz band) is one of attention-drawing standards because IEEE 802.11ad supports communication performed at an effective speed exceeding 2 Gbps.

Current access points for a 2.4 GHz band or a 5 GHz band are assumed to be extended to access points for millimeter-wave wireless-LANs (for example, in the 60 GHz band), which will be widespread in the future, and a handover function will be needed. In a hot spot composed of a plurality of access points, the handover function enables a communication terminal to move to and from the access points.

For example, Japanese Unexamined Patent Application Publication No. 2005-175932 discloses a wireless LAN handover technique used in general wireless communication. However, it takes time for the technique in Japanese Unexamined Patent Application Publication No. 2005-175932 to execute a scanning process and a received-signal-level comparison process, and quick handover is thus difficult.

Japanese Unexamined Patent Application Publication No. 2005-341254 discloses a technique by which handover is quickly performed in wireless communication using a microwave band frequency (for example, 2.4 GHz band or 5 GHz band) in such a manner that an onboard communication terminal identifies an optimum access point on the basis of vehicle location information.

The wireless communication using the millimeter-wave band frequency enables high-speed communication but has a short communication range and a high directivity. Accordingly, the communication between a communication terminal and a communication counterpart needs to be line-of-sight communication, and the communication terminal thus needs to perform handover to an access point where a line-of-sight communication path is ensured.

However, in the handover technique described in Japanese Unexamined Patent Application Publication No. 2005-341254, it is difficult for the communication terminal to judge whether a line-of-sight communication path is ensured between the communication terminal and an access point that is a handover destination candidate, and it is thus difficult to apply the handover technique to handover in the wireless communication using a millimeter-wave band frequency.

SUMMARY

One non-limiting and exemplary embodiment of the present disclosure facilitates providing a communication terminal, a communication apparatus, and a communication system that quickly perform handover that ensure a line-of-sight communication path in wireless communication using in a millimeter-wave band frequency.

In one general aspect, the techniques disclosed here feature a communication terminal including visible-light reception circuitry, handover control circuitry and millimeter-wave communication circuitry. The visible-light reception circuitry, which in operation, receives visible-light data from a first communication apparatus. The handover control circuitry, which in operation, sets the first communication apparatus as a handover destination in accordance with the visible-light data. The millimeter-wave communication circuitry, which in operation, performs communication using a millimeter-wave band frequency with the first communication apparatus.

It should be noted that general or specific embodiments may be implemented as a system, a method, an integrated circuit, a computer program, a storage medium, or any selective combination thereof.

According to the aspect of the present disclosure, a plurality of communication apparatuses ensuring a line of sight path perform quickly handover in wireless communication using a millimeter-wave band frequency.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
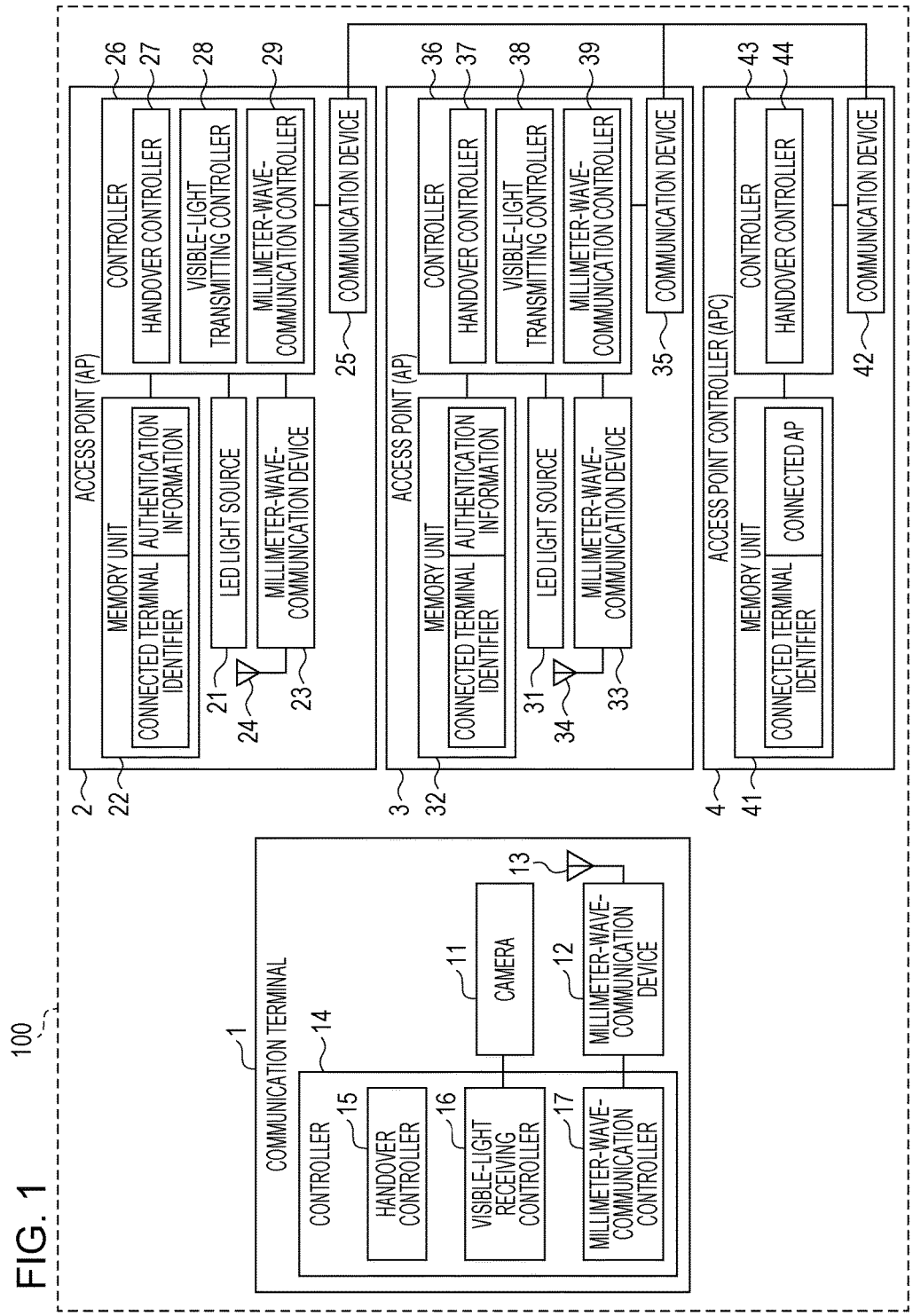
FIG. 1 illustrates an example configuration of a millimeter-wave wireless-LAN connection system according to an embodiment of the present disclosure.

First, the background of the present disclosure will be described. The present disclosure relates to a communication terminal, a communication apparatus, and a communication system that perform handover in communication using a millimeter-wave band frequency.

A handover function is needed in a hot spot composed of a plurality of wireless-LAN access points supporting a millimeter-wave (for example, 60 GHz band). The handover function enables a communication terminal to move to and from the access points.

For example, Japanese Unexamined Patent Application Publication No. 2005-175932 discloses a wireless LAN handover technique used in general wireless communication. By using the technique, a communication terminal searches for an access point on the basis of the levels of received signals from access points and performs handover to the found access point.

Specifically, the communication terminal first monitors the level of a received signal from an access point that is connected and judges whether the level is sufficiently high to continue communication. When the level is not sufficiently high, the communication terminal calculates a period of time for a scanning process on the basis of the signal level and performs the scanning process until the period of time elapses. In the scanning process, the signal levels of neighboring access points are monitored. The communication terminal then compares the level of the received signal from the connected access point with the level of one of the signals of the neighboring access points detected in the scanning process. When the level of the detected signal from the corresponding access point is higher than the level of the signal from the connected access point, the communication terminal performs handover to the detected access point.

The technique in Japanese Unexamined Patent Application Publication No. 2005-175932 speeds up the handover in such a manner that after the received signal level becomes too low to continue the communication, the scanning process is performed based on a time division scheme. However, in the technique in Japanese Unexamined Patent Application Publication No. 2005-175932, it takes time to execute the scanning process and the received-signal-level comparison process, and the overhead from the start to the end of the handover is high. Quick handover is thus difficult.

An example of a technique for reducing overhead and performing handover quickly is disclosed in Japanese Unexamined Patent Application Publication No, 2005-341254. By using the technique, an onboard communication terminal identifies an optimum access point on the vehicle route on the basis of the vehicle location information, and handover to the identified access point is then performed.

Specifically, a global positioning system (GPS) receiver of the vehicle including the communication terminal first acquires information regarding the current location and a driving direction of the vehicle. The communication terminal searches for an access point located in the vehicle's way (that is, an optimum access point on the driving route of the vehicle) by using location information regarding access points stored in a database and the acquired information regarding the current location and the driving direction of the vehicle. The communication terminal connects to the found access point.

The wireless communication using a millimeter-wave band frequency enables high-speed communication but has a short communication range and a high directivity. Accordingly, the communication between the communication terminal and a communication counterpart needs to be line-of-sight communication. If it is difficult to ensure a line-of-sight communication path between an access point and the communication terminal, it is difficult for the communication terminal to perform handover to the access point.

However, in the handover technique described in Japanese Unexamined Patent Application Publication No. 2005-341254, it is difficult for the communication terminal to judge whether a line-of-sight communication path is ensured between the communication terminal and an access point that is a handover destination candidate, and it is thus difficult to apply the handover technique to handover in the wireless communication using a millimeter-wave band frequency.

Under these circumstances, the present disclosure focuses on a fact that the feature of the wireless communication using a millimeter-wave band frequency is similar to the feature of visible light communication. The feature of the wireless communication using the millimeter-wave band frequency is that the wireless communication has a short communication range and a high directivity and that the communication between the communication terminal and a communication counterpart thus needs to be line-of-sight communication.

Hereinafter, an embodiment of the present disclosure will be described in detail with reference to the drawings. Note that the embodiment to be described later is an example, and the present disclosure is not limited to the embodiment.

Embodiment

An embodiment of the present disclosure will be described in detail with reference to the drawings.

FIG. 1 is a block diagram illustrating an example configuration of a millimeter-wave wireless-LAN connection system 100 according to the embodiment. As illustrated in FIG. 1, the millimeter-wave wireless-LAN connection system 100 includes a communication terminal 1, access points (APs) 2 and 3, and an access-point controller (APC) 4.

The communication terminal 1 is a communication terminal that includes a camera and that performs communication using a millimeter-wave band frequency. Examples of the communication terminal 1 include a smartphone. The APs 2 and 3 are wireless-LAN access points using the millimeter-wave band frequency. The APC 4 is a control device that is connected, in a wired LAN or the like, to the APs 2 and 3 supporting the millimeter-wave band frequency and that comprehensively manages APs. The APC 4 may be, for example, a personal computer (PC).

The communication terminal 1 includes a camera 11, a millimeter-wave-communication device 12, an antenna 13, and a controller 14.

The camera 11 is an imaging device that includes a lens (not illustrated) and an image sensor (not illustrated) and that takes an image of an object located around the communication terminal 1. The camera 11 receives visible-light data (image data) transmitted from an AP (that is, takes an image). Specifically, the camera 11 is a receiving device of the communication terminal 1 for the visible light communication. The visible-light data is, for example, an optical identifier (ID) signal including given information.

The millimeter-wave-communication device 12 is a wireless communication device that performs, through the antenna 13, wireless communication using a millimeter-wave band frequency (for example, 60 GHz band) specified in, for example, IEEE 802.11ad. The millimeter-wave-communication device 12 connects to and performs communication with millimeter-wave communication devices 23 and 33 of the respective APs 2 and 3 (described later). The millimeter-wave-communication device 12 is disposed, for example, near an imaging unit (the lens and the image sensor) of the camera 11.

The controller 14 is a control device such as a processor that executes various information processing. The controller 14 includes a handover controller 15, a visible-light receiving controller 16, and a millimeter-wave-communication controller 17.

For example, when the communication terminal 1 performs handover from a handover source AP (hereinafter, referred to as a source AP) (for example, the AP 2) to a destination AP (for example, the AP 3), the handover controller 15 controls processes related to the handover such as transmitting and receiving commands (messages) between the communication terminal 1 and the source AP and between the communication terminal 1 and the destination AP.

The visible-light receiving controller 16 receives the visible-light data via, for example, the image sensor of the camera 11.

The millimeter-wave-communication controller 17 turns on the millimeter-wave-communication device 12 and thereafter performs wireless connection to and communication with an AP (for example, the AP 2 or 3) by using a millimeter-wave frequency (for example, the 60 GHz band in the case of the IEEE 802.11ad communication standard). The wireless connection and communication may be implemented by, for example, beam forming.

The communication terminal 1 may be any apparatus, as long as the apparatus includes the camera 11, the millimeter-wave-communication device 12, the antenna 13, and the controller 14 that are described above. The communication terminal 1 is not limited to the smartphone.

In the communication terminal 1, the camera 11 and the visible-light receiving controller 16 may be collectively referred to as a "visible-light receiver", and the millimeter-wave-communication device 12, the antenna 13, and the millimeter-wave-communication controller 17 may be collectively referred to as a "millimeter-wave communication device".

The AP 2 includes, a light emitting diode (LED) light source 21, a memory unit 22, the millimeter-wave-communication device 23, an antenna 24, a communication device 25, and a controller 26. The AP 3 includes an LED light source 31, a memory unit 32, the millimeter-wave-communication device 33, an antenna 34, a communication device 35, and a controller 36. Hereinafter, the configuration of the AP 2 will be described. The AP 3 has the same configuration as that of the AP 2.

The LED light source 21 is a light emitting device that transmits visible-light data by blinking, for example, LEDs at regular intervals. Examples of the LED light source 21 include a white light illuminator, a signboard using an internal lighting system, and a liquid crystal display. The visible-light data transmitted from the LED light source 21 is received by the camera 11 of the communication terminal 1. Specifically, the LED light source 21 is a transmission device for the visible light communication in the AP 2.

The memory unit 22 is a storage device that stores various pieces of data, such as a hard disk drive (HDD) or a memory card. The memory unit 22 stores information such as communication terminal authentication information used when a communication terminal connects to the AP 2. For example, the memory unit 22 stores therein information regarding a communication terminal that is connected to the AP 2 and authentication information for the communication terminal in association with each other.

The millimeter-wave-communication device 23 is a wireless communication device that performs, through the antenna 24, wireless communication using the millimeter-wave band frequency (for example, the 60 GHz band) specified, for example, in IEEE 802.11ad. The millimeter-wave-communication device 23 is disposed, for example, near the LED light source 21.

The communication range of the visible light communication using the LED light source 21 is set approximately identical to the communication range of the millimeter-wave communication performed by the millimeter-wave-communication device 23. For example, the communication range of the visible light communication is 0.9 times to 1.1 times the communication range of the millimeter-wave communication. The communication direction of the visible light communication may be set to match the communication direction of the millimeter-wave communication.

The communication device 25 is connected to a communication device 42 of the ARC 4 (described later), for example, in the wired LAN and performs communication between the AP 2 and the ARC 4.

The controller 26 is a control device such as a processor that executes various information processing. The controller 26 includes a handover controller 27, a visible-light transmitting controller 28, and a millimeter-wave-communication controller 29. Like the controller 26, the controller 36 includes a handover controller 37, a visible-light transmitting controller 38, and a millimeter-wave-communication controller 39. Hereinafter, the configuration of the controller 26 will be described. The controller 36 has the same configuration as that of the controller 26.

The handover controller 27 controls processes related to handover such as transmitting and receiving commands (messages) between a communication terminal and the ARC 4. For example, the handover controller 27 performs control such as to transfer a handover request from a communication terminal that performs handover (for example, the communication terminal 1) to the APC 4 and to transfer communication terminal authentication information stored in the memory unit 22 to the ARC 4 in accordance with a received command.

The visible-light transmitting controller 28 controls the LED light source 21 so as to transmit, for example, the visible-light data. The LED light source 21 emits light under the control of the visible-light transmitting controller 28 and thereby transmits the visible-light data.

For example, the millimeter-wave-communication controller 29 turns on the millimeter-wave-communication device 23 and thereafter performs wireless connection to and communication with the communication terminal 1 by using the millimeter-wave (the 60 GHz band, for example, in the case of IEEE 802.11ad). The wireless connection and communication may be implemented by, for example, beam forming.

In the AP 2, the LED light source 21 and the visible-light transmitting controller 28 may be collectively referred to as a "visible-light transmitter", and the millimeter-wave-communication device 23, the antenna 24, and the millimeter-wave-communication controller 29 may be collectively referred to as a "millimeter-wave communication device".

The ARC 4 is an apparatus that manages and controls the APs 2 and 3. The APC 4 includes a memory unit 41, a communication device 42, and a controller 43.

The memory unit 41 is a storage device that stores various pieces of data, such as a HDD or a memory card. The memory unit 41 stores therein data such as information regarding connection to APs (for example, the APs 2 and 3) controlled by the ARC 4. For example, in the connection information stored in the memory unit 41, a communication terminal connected to any one of the controlled APs is associated with the AP.

The communication device 42 is connected to the communication devices (communication devices 25 and 35) of the controlled APs, for example, in a wired LAN and performs wired communication with the controlled APs.

The controller 43 is a control device that performs various information processing, such as a processor. The controller 43 includes a handover controller 44.

The handover controller 44 performs control related to handover, such as to generate a handover-request reply to a handover request from a controlled AP, to acquire authentication information for a communication terminal that performs handover (for example, the communication terminal 1), and to transfer the authentication information.

Figure 2:
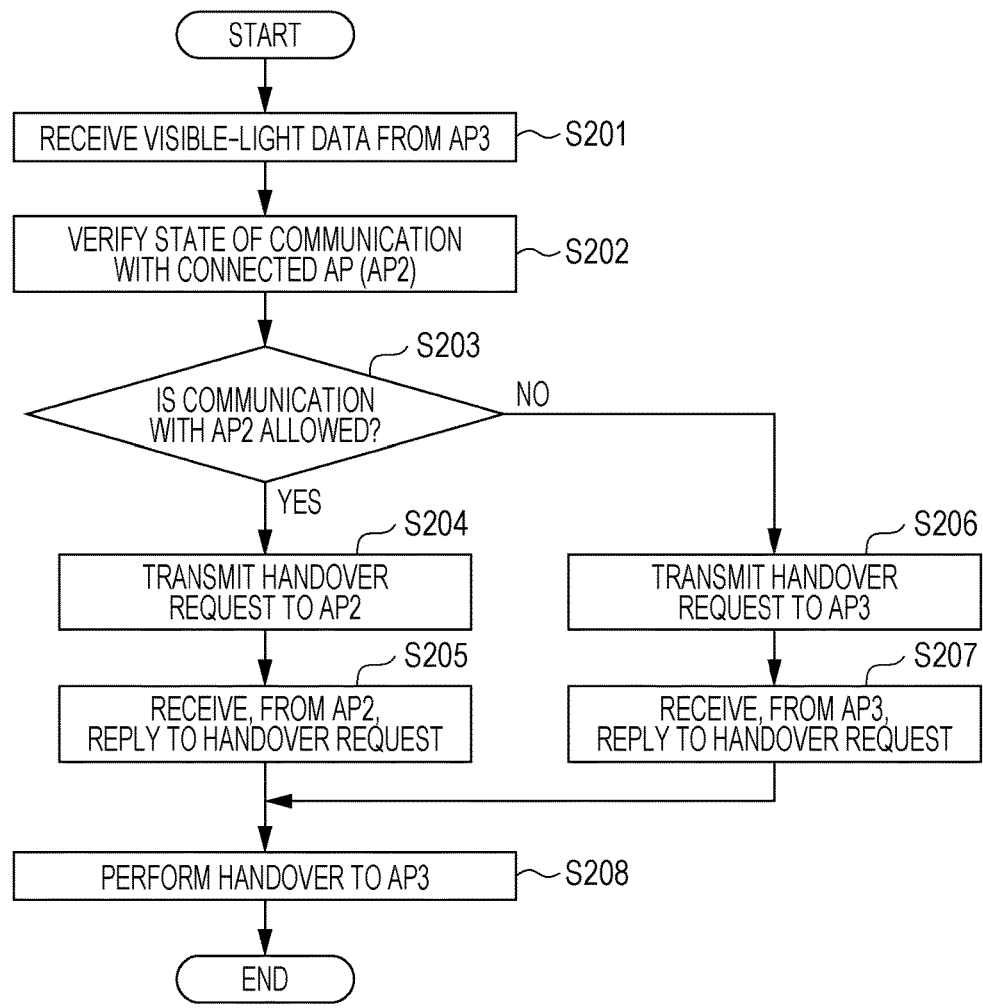
FIG. 2 illustrates an example flowchart of handover control performed by a communication terminal in the embodiment of the present disclosure.

Handover control performed by the communication terminal 1 will be described. FIG. 2 is a flowchart illustrating an example of the handover control performed by the communication terminal 1 in the embodiment. Note that FIG. 2 illustrates an example in which the communication terminal 1 performs handover to the AP 3 while being connected to the AP 2. Specifically, in FIG. 2, the AP 2 is a handover source AP connected to the communication terminal 1, and the AP 3 is a handover destination AP to newly connect to the communication terminal 1 after the communication terminal 1 performs handover. Note that an AP connected to the communication terminal 1 is an AP that holds and manages authentication information for the communication terminal 1.

The visible-light receiving controller 16 of the communication terminal 1 receives visible-light data from the AP 3 via the camera 11 (S201). The handover controller 15 acquires the visible-light data from the visible-light receiving controller 16. The handover controller 15 extracts, from the acquired visible-light data, the identifier (for example, the basic service set identifier (BSSID) of the AP 3) of the AP 3 having transmitted the visible-light data and thereby judges that handover to the AP 3 is allowed.

The visible-light receiving controller 16 receives the visible-light data from the AP 3 that is different from the connected AP 2 because the movement of the communication terminal 1 causes a change in location of the communication terminal 1 or the orientation of the camera 11. Upon receiving the visible-light data from the AP 3, the handover controller 15 judges that the handover to the AP 3 is allowed. Since the communication range of the visible light communication is set approximately identical to the communication range of the millimeter-wave communication, the availability of the visible light communication with the AP 3 indicates that a line-of-sight communication path between the communication terminal 1 and the AP 3 is ensured. Upon receiving the visible-light data, the communication terminal 1 can thus judge that the handover to the AP 3 is allowed.

The handover controller 15 verifies the state of communication with the connected AP 2 (S202). For example, the handover controller 15 compares the quality of the communication with the connected AP 2 (for example, a received signal strength indicator (RSSI)) with a predetermined value.

The handover controller 15 judges whether the communication with the AP 2 is allowed (S203). For example, when the communication quality is equal to or higher than the predetermined value, the handover controller 15 judges that the communication with the AP 2 is allowed (a connected state). When the communication quality is lower than the predetermined value, the handover controller 15 judges that the communication with the AP 2 is not allowed (in a disconnected state).

When the handover controller 15 judges in S203 that the communication with the AP 2 is allowed (YES in S203), the handover controller 15 transmits a handover request to the AP 2 via the millimeter-wave-communication device 12 (S204). The handover control then proceeds to S205.

The handover controller 15 receives, from the AP 2 via the millimeter-wave-communication device 12, a reply to the handover request (a handover-request reply) (S205). The handover control then proceeds to S208.

When the handover controller 15 judges in S203 that the communication with the AP 2 is not allowed (NO in S203), the handover controller 15 transmits a handover request to the AP 3 via the millimeter-wave-communication device 12 (S206). The handover control then proceeds to S207.

The handover controller 15 receives a handover-request reply from the AP 3 via the millimeter-wave-communication device 12 (S207). The handover control then proceeds to S208.

After receiving the handover-request reply, the handover controller 15 performs the handover to the AP 3 and subsequent millimeter-wave communication with the AP 3 (S208). The handover control then ends.

Examples of a handover control operation of the millimeter-wave wireless-LAN connection system 100 in the embodiment will be described.

As illustrated in FIG. 2, the handover control operation of the millimeter-wave wireless-LAN connection system 100 varies depending on whether the communication terminal 1 performing the handover control can communicate with a connected (handover source) AP. First, example handover control performed when the communication terminal 1 can communicate with the connected (handover source) AP will be described.

Figure 3:
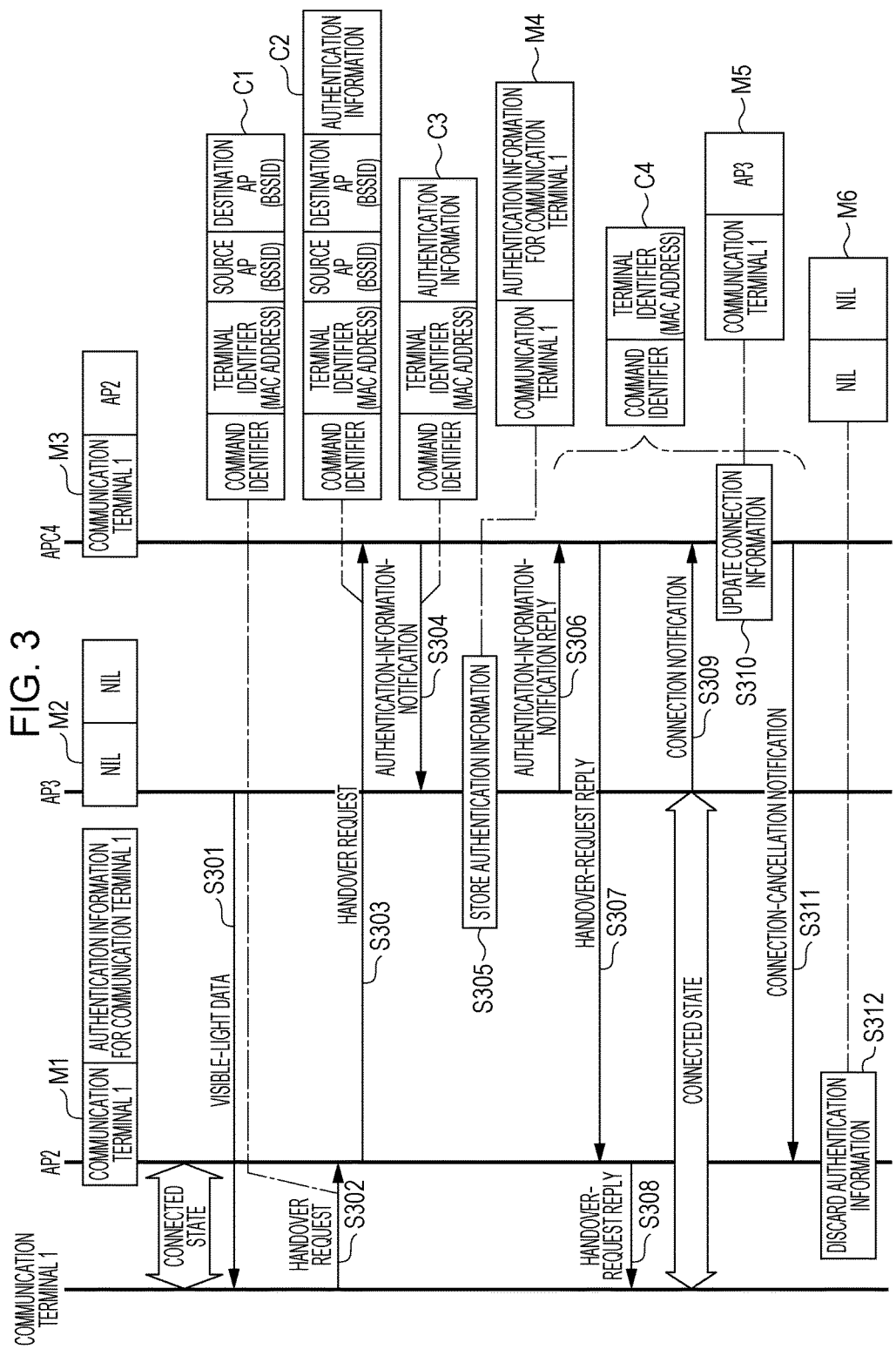
FIG. 3 illustrates a first example of a handover control operation of the millimeter-wave wireless-LAN connection system in the embodiment of the present disclosure.

FIG. 3 is a sequence diagram illustrating a first example of the handover control operation of the millimeter-wave wireless-LAN connection system 100 in the embodiment. FIG. 3 illustrates operations performed by the communication terminal 1, the AP 2 that is connected to the communication terminal 1, the AP 3 to be newly connected when the communication terminal 1 performs handover, and the APC 4 controlling the APs 2 and 3. FIG. 3 also illustrates example formats (commands C1 to C4) of commands (messages) to be transmitted and received in the operations and example pieces of information (pieces of information M1 to M6) stored in the memory units 22, 32, and 41 of the APs 2 and 3 and the APC 4, respectively.

The pieces of information M1 to M3 each indicate information regarding the communication terminal 1 stored in the corresponding memory unit 22, 32, or 41 before the communication terminal 1 performs the handover. Since the AP 2 is in a state of connection with the communication terminal 1, the memory unit 22 of the AP 2 stores therein the information M1 including the terminal identifier of the communication terminal 1 and authentication information for the communication terminal 1. The memory unit 41 of the ARC 4 stores therein the information M3 indicating a relationship between the communication terminal 1 and the AP 2 as connection information regarding the communication terminal 1. Since the AP 3 is not in a state of connection with the communication terminal 1, the memory unit 32 of the AP 3 does not have information regarding the communication terminal 1 stored therein, as indicated by the information M2.

The handover controller 15 of the communication terminal 1 receives visible-light data from the AP 3 via the camera 11 (S301). The visible-light data is an optical ID signal including given information such as the identifier of the AP 3 (for example, the BSSID of the AP 3).

When the communication terminal 1 receives the visible-light data from the AP 3, the communication terminal 1 judges that millimeter-wave communication with the AP 3 having transmitted the visible-light data is allowed, that is, handover to the AP 3 is allowed. The communication terminal 1 thus performs the handover to the AP 3.

The handover controller 15 of the communication terminal 1 verifies the state of communication with the AP 2 connected to the communication terminal 1. In FIG. 3, the communication terminal 1 can perform the communication with the AP 2, and the handover controller 15 thus transmits a handover request to the AP 2 via the millimeter-wave-communication device 12 (S302).

The command C1 indicates the format of a command for the handover request transmitted by the handover controller 15 in S302. The command C1 includes a "command identifier", a "terminal identifier", a "source AP", and a "destination AP". The handover controller 15 sets an identifier indicating a handover request as the "command identifier", an identifier indicating the communication terminal 1 (for example, the MAC address of the communication terminal 1) as the "terminal identifier", and an identifier indicating the AP 2 (for example, the BSSID of the AP 2) as the "source AP". The handover controller 15 sets an identifier indicating the AP 3 (for example, the BSSID of the AP 3) as the "destination AP" on the basis of the received visible-light data. After setting the identifiers, the handover controller 15 transmits the handover request to the AP 2.

The handover controller 27 of the AP 2 receives the command C1 via the millimeter-wave-communication device 23. The handover controller 27 verifies that the identifier as the "command identifier" in the command C1 indicates a handover request. From the identifier as the "terminal identifier" in the command C1, the handover controller 27 verifies that the terminal having transmitted the handover request is the communication terminal 1. The handover controller 27 refers to the information M1 stored in the memory unit 22 and judges that the communication terminal 1 having transmitted the handover request is the communication terminal connected to itself (that is, the AP 2). Based on the information M1 stored in the memory unit 22, the handover controller 27 transmits a command for a handover request including the authentication information for the communication terminal 1 to the APC 4 via the communication device 25 (S303).

The command C2 indicates the format of the command for the handover request transmitted by the handover controller 27 in S303. The command C2 includes a "command identifier", a "terminal identifier", a "source AP", a "destination AP", and "authentication information". The handover controller 27 respectively sets, as the "command identifier", the "terminal identifier", the "source AP", and the "destination AP" in the command C2, the same identifiers as the identifiers in the command C1 for the received handover request. Based on the information M1 stored in the memory unit 22, the handover controller 27 sets the authentication information for the communication terminal 1 as the "authentication information" in the command C2 and transmits the command C2 to the APC 4.

The handover controller 44 of the APC 4 receives the command C2 via the communication device 42. The handover controller 44 verifies that the identifier as the "command identifier" in the command C2 indicates a handover request. The handover controller 44 verifies that the "authentication information" is included in the command C2. When the "authentication information" is included in the command C2 for the handover request, the handover controller 44 transmits an authentication-information notification to the AP 3 indicated by the "destination AP" via the communication device 42 to notify the AP 3 of the "authentication information" (S304).

The command C3 indicates the format of a command for the authentication-information notification transmitted by the handover controller 44 in S304. The command C3 includes a "command identifier", a "terminal identifier", and "authentication information". The handover controller 44 sets an identifier indicating an authentication-information notification as the "command identifier". Based on the received command C2, the handover controller 44 sets the identifier indicating the communication terminal 1 as the "terminal identifier" and the authentication information for the communication terminal 1 as the "authentication information". The handover controller 44 transmits, to the AP 3, the command C3 for the set authentication-information notification.

The handover controller 37 of the AP 3 receives the command C3 via the communication device 35. The handover controller 37 verifies that the identifier as the "command identifier" in the command C3 indicates an authentication-information notification. The handover controller 37 acquires the "terminal identifier" and the "authentication information" from the command C3 and stores the authentication information in the memory unit 32 (S305).

The information M4 is information stored in the memory unit 32 in S305. Since the AP 3 is not connected to the communication terminal 1 before the command C3 for the authentication-information notification is received, the authentication information for the communication terminal 1 has not been stored in the memory unit 32, as indicated by the information M2. After receiving the command C3 for the authentication-information notification, the handover controller 37 stores, in the memory unit 32, the information M4 including the terminal identifier of the communication terminal 1 and the authentication information for the communication terminal 1.

The handover controller 37 transmits, to the APC 4 via the communication device 35, an authentication-information-notification reply that is a reply to the authentication-information notification (S306).

The command C4 indicates the format of a command for the authentication-information-notification reply transmitted by the handover controller 37 in S306. The command C4 includes a "command identifier" and a "terminal identifier". The handover controller 37 sets, in the command C4, an identifier indicating an authentication-information-notification reply as the "command identifier" and the identifier indicating the communication terminal 1 as the "terminal identifier" and transmits the command C4 to the APC 4.

The handover controller 44 of the APC 4 receives the command C4 via the communication device 42. The handover controller 44 verifies that the identifier as the "command identifier" in the command C4 indicates an authentication-information-notification reply. The handover controller 44 transmits the handover-request reply to the AP 2 via the communication device 42 (S307).

The format of the command for the handover-request reply transmitted by the handover controller 44 in S307 includes the "command identifier" and the "terminal identifier", as indicated by the command C4. The handover controller 44 sets, in the command C4, an identifier indicating a handover-request reply as the "command identifier" and the identifier indicating the communication terminal 1 as the "terminal identifier" and transmits the command C4 to the AP 2.

The handover controller 27 of the AP 2 receives the command C4 via the communication device 25. The handover controller 27 verifies that the identifier as the "command identifier" in the command C4 indicates a handover-request reply. The handover controller 27 transmits the handover-request reply to the communication terminal 1 via the millimeter-wave-communication device 23 (S308).

The handover-request reply transmitted by the handover controller 27 in S308 is the same as the handover-request reply received from the handover controller 44 in S307.

The handover controller 15 of the communication terminal 1 receives the command C4 via the millimeter-wave-communication device 12. The handover controller 15 verifies that the identifier as the "command identifier" in the command C4 indicates a handover-request reply and thereby judges that the handover is complete. The handover controller 15 of the communication terminal 1 connects the millimeter-wave-communication device 12 to the millimeter-wave-communication device 33 of the AP 3 and starts millimeter-wave communication. That is, the communication terminal 1 and the AP 3 are connected to each other.

The AP 3 enters the state of connection with the communication terminal 1. Upon receiving a signal (for example, a signal regularly transmitted and received between a communication terminal and an AP, such as Keep-Alive) from the millimeter-wave-communication device 12 via the millimeter-wave-communication device 33, the handover controller 37 of the AP 3 transmits a connection notification to the APC 4 (S309).

The format of the connection notification transmitted by the handover controller 37 in S309 includes the "command identifier" and the "terminal identifier", as indicated by the command C4. The handover controller 37 sets, in the command C4, an identifier indicating a connection notification as the "command identifier" and the identifier indicating the communication terminal 1 as the "terminal identifier" and transmits the command C4 to the APC 4.

The handover controller 44 of the APC 4 receives the command C4 via the communication device 42. When the handover controller 44 verifies that the identifier as the "command identifier" in the command C4 indicates a connection notification, the handover controller 44 judges that connection between the communication terminal 1 indicated by the identifier as the "terminal identifier" in the command C4 and the AP 3 having transmitted the connection notification is complete. The handover controller 44 then updates the connection information regarding the communication terminal 1 stored in the memory unit 41 of the APC 4 (S310).

The information M5 is connection information regarding the communication terminal 1 resulting from the update in S310. Before the connection notification is received, the memory unit 41 has stored therein the information M3 as connection information. After receiving the command C4 for the connection notification, the handover controller 44 stores, in the memory unit 41, the information M5 as the connection information regarding the communication terminal 1. In the information M5, the AP 2 that is an AP connected to the communication terminal 1 is updated with the AP 3.

The handover controller 44 transmits a connection-cancellation notification to the AP 2 via the communication device 42 (S311).

The format of the connection-cancellation notification transmitted by the handover controller 44 in S311 includes the "command identifier" and the "terminal identifier", as indicated by the command C4. The handover controller 44 sets, in the command C4, an identifier indicating a connection-cancellation notification as the "command identifier" and the identifier indicating the communication terminal 1 as the "terminal identifier" and transmits the command C4 to the AP 2.

The handover controller 27 of the AP 2 receives the command C4 via the communication device 25. When the handover controller 27 verifies that the identifier as the "command identifier" in the command C4 indicates a connection-cancellation notification, the handover controller 27 cancels the connection to the communication terminal 1 indicated by the identifier as the "terminal identifier" in the command C4 and discards the authentication information for the communication terminal 1 stored in the memory unit 22 (S312).

The information M6 indicates a state after the authentication information for the communication terminal 1 is discarded in S312. After receiving the connection-cancellation notification, the handover controller 27 discards the authentication information in the information M1 stored in the memory unit 22. Specifically, as indicated by the information M6, the memory unit 22 does not have information regarding the communication terminal 1 stored therein.

Upon receiving the visible-light data, the communication terminal 1 transmits the handover request via the connected AP 2 under the handover control described above. When the communication terminal 1 receives the handover-request reply via the connected AP 2, the handover is complete.

Hereinafter, example handover control performed when the communication terminal 1 is not allowed to communicate with a connected AP will be described.

Figure 4:
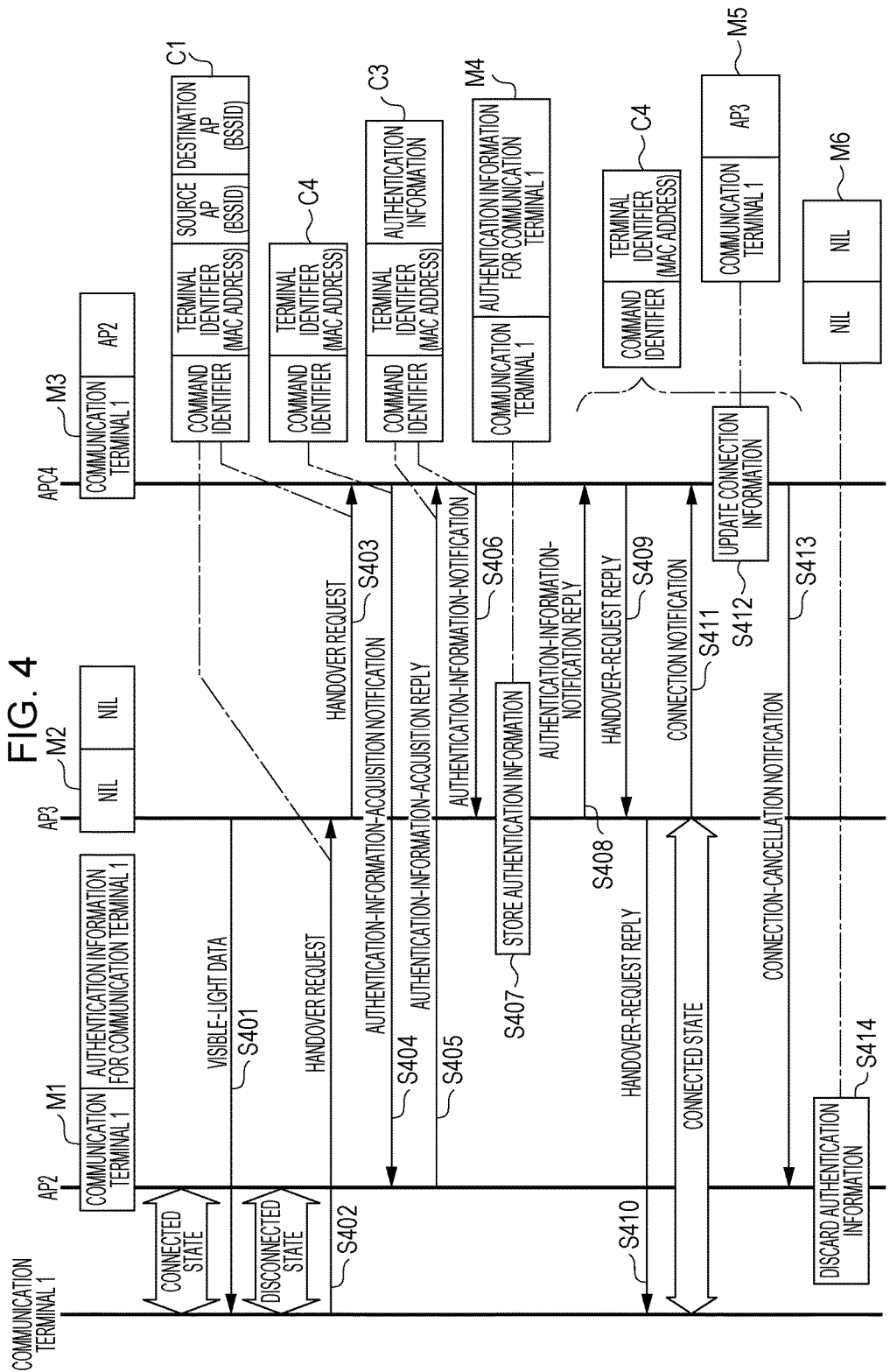
FIG. 4 illustrates a second example of the handover control operation of the millimeter-wave wireless-LAN connection system in the embodiment of the present disclosure.

FIG. 4 is a sequence diagram indicating a second example of the handover control operation of the millimeter-wave wireless-LAN connection system 100 in the embodiment. Like FIG. 3, FIG. 4 illustrates operations performed by the communication terminal 1, the AP 2 that is connected to the communication terminal 1, the AP 3 to be newly connected when the communication terminal 1 performs handover, and the APC 4 controlling the APs 2 and 3. FIG. 4 also illustrates the example formats (commands C1 to C4) of commands (messages) to be transmitted and received in the operations and the example pieces of information (pieces of information M1 to M6) stored in the memory units 22, 32, and 41 of the APs 2 and 3 and the ARC 4, respectively. Note that the pieces of information M1 to M3 in FIG. 4 are the same as the pieces of information M1 to M3 in FIG. 3, and detailed description thereof is omitted.

The handover control illustrated in FIG. 4 is different from the handover control illustrated in FIG. 3 in that after the communication terminal 1 receives the visible-light data transmitted from the AP 3 (that is, after S401 in FIG. 4), the communication with the AP 2 connected to the communication terminal 1 is disconnected. Accordingly, in the handover control illustrated in FIG. 4, an AP that receives a handover request transmitted from the communication terminal 1 and an AP that receives a handover-request reply to be received by the communication terminal 1 are different from those in the handover control illustrated in FIG. 3. In addition, in contrast to the handover control illustrated in FIG. 3, processes in which the APC 4 requests the AP 2 for authentication information for the communication terminal 1 and acquires the authentication information are added in the handover control illustrated in FIG. 4.

The handover controller 15 of the communication terminal 1 receives visible-light data from the AP 3 via the camera 11 (S401). The visible-light data is an optical ID signal including given information such as the identifier of the AP 3 (for example, the BSSID of the AP 3).

When the communication terminal 1 receives the visible-light data from the AP 3, the communication terminal 1 judges that millimeter-wave communication with the AP 3 having transmitted the visible-light data is allowed, that is, handover to the AP 3 is allowed. The communication terminal 1 thus performs the handover to the AP 3.

The handover controller 15 of the communication terminal 1 verifies the state of communication with the AP 2 connected to the communication terminal 1. In FIG. 4, the communication terminal 1 is disconnected from the AP 2 and is thus not allowed to perform communication with the AP 2. The handover controller 15 thus transmits a handover request to the AP 3 via the millimeter-wave-communication device 12 (S402).

The command C1 indicates the format of a command for the handover request transmitted by the handover controller 15 in S402. The command C1 includes a "command identifier", a "terminal identifier", a "source AP", and a "destination AP". The handover controller 15 sets an identifier indicating a handover request as the "command identifier", an identifier indicating the communication terminal 1 (for example, the MAC address of the communication terminal 1) as the "terminal identifier", and an identifier indicating the AP 2 (for example, the BSSID of the AP 2) as the "source AP". The handover controller 15 sets an identifier indicating the AP 3 (for example, the BSSID of the AP 3) as the "destination AP" on the basis of the received visible-light data. After setting the identifiers, the handover controller 15 transmits the handover request to the AP 3.

The handover controller 37 of the AP 3 receives the command C1 via the millimeter-wave-communication device 33. The handover controller 37 verifies that the identifier as the "command identifier" in the command C1 indicates a handover request. From the identifier as the "terminal identifier" in the command C1, the handover controller 37 verifies that the terminal having transmitted the handover request is the communication terminal 1. The handover controller 37 refers to the authentication information (for example, the information M2) stored in the memory unit 32 and judges that the communication terminal 1 having transmitted the handover request is a communication terminal not connected to itself (that is, the AP 3). In this case, the handover controller 37 transmits the command C1 for the received handover request to the ARC 4 via the communication device 35 without any change (S403).

The handover controller 44 of the ARC 4 receives the command C1 via the communication device 42. The handover controller 44 verifies that the identifier as the "command identifier" in the command C1 indicates a handover request. The handover controller 44 verifies that the command C1 does not include the "authentication information". When the command C1 for the handover request does not include the "authentication information", the handover controller 44 transmits an authentication-information-acquisition notification to the AP 2 indicated by the "source AP" via the communication device 42 to request the AP 2 for the "authentication information" and to acquire the "authentication information" (S404).

The command C4 indicates the format of a command for the authentication-information-acquisition notification transmitted by the handover controller 44 in S404. The command C4 includes a "command identifier" and a "terminal identifier". The handover controller 44 sets an identifier indicating an authentication-information-acquisition notification as the "command identifier". The handover controller 44 sets the identifier indicating the communication terminal 1 as the "terminal identifier" on the basis of the received command C1. The handover controller 44 transmits, to the AP 2, the set command C4 for the authentication-information-acquisition notification.

The handover controller 27 of the AP 2 receives the command C4 via the communication device 25. The handover controller 27 verifies that the identifier as the "command identifier" in the command C4 indicates an authentication-information-acquisition notification and that the identifier as the "terminal identifier" in the command C4 indicates the communication terminal 1. The handover controller 27 refers to the information M1 regarding the communication terminal 1 stored in the memory unit 22 and sets an authentication-information-acquisition reply. The handover controller 27 transmits the authentication-information-acquisition reply to the APC 4 via the communication device 25 (S405).

The command C3 indicates the format of a command for the authentication-information-acquisition reply transmitted by the handover controller 27 in S405. The command C3 includes a "command identifier", a "terminal identifier", and "authentication information". The handover controller 27 sets an identifier indicating an authentication-information-acquisition reply as the "command identifier". The handover controller 27 sets the identifier indicating the communication terminal 1 as the "terminal identifier" on the basis of the received command C4. The handover controller 27 refers to the information M1 regarding the communication terminal 1 stored in the memory unit 22 and sets authentication information for the communication terminal 1 as the "authentication information". The handover controller 27 transmits, to the ARC 4, the command C3 for the set authentication-information-acquisition reply.

The handover controller 44 of the ARC 4 receives the command C3 via the communication device 42. The handover controller 44 verifies that the identifier as the "command identifier" in the command C3 indicates an authentication-information-acquisition reply. The handover controller 44 verifies that the "authentication information" is included in the command C3. The handover controller 44 transmits an authentication-information notification, via the communication device 42, to the AP 3 indicated by the "destination AP" in the command C1 for the handover request received in S403 to notify the AP 3 of the "authentication information" (S406).

The format of the command for the authentication-information notification transmitted by the handover controller 44 in S406 includes the "command identifier", the "terminal identifier", and the "authentication information", as indicated by the command C3. The handover controller 44 sets an identifier indicating an authentication-information notification as the "command identifier". Based on the command C3 for the received authentication-information-acquisition reply, the handover controller 44 sets the identifier indicating the communication terminal 1 as the "terminal identifier" and the authentication information for the communication terminal 1 as the "authentication information". The handover controller 44 transmits, to the AP 3, the set command C3 for the authentication-information notification.

The handover controller 37 of the AP 3 receives the command C3 via the communication device 35. The handover controller 37 verifies that the identifier as the "command identifier" in the command C3 indicates an authentication-information notification. The handover controller 37 acquires the "terminal identifier" and the "authentication information" from the command C3 and stores the authentication information in the memory unit 32 (S407).

The information M4 is information stored in the memory unit 32 in S407. The AP 3 is not connected to the communication terminal 1 before receiving the command C3 for the authentication-information notification, and the memory unit 32 does thus not have the authentication information for the communication terminal 1 stored therein, as indicated by the information M2. After receiving the command C3 for the authentication-information notification, the handover controller 37 stores, in the memory unit 32, the information M4 including the terminal identifier of the communication terminal 1 and the authentication information for the communication terminal 1.

The handover controller 37 transmits, to the APC 4 via the communication device 35, an authentication-information-notification reply that is a reply to the authentication-information notification (S408).

The command for the authentication-information-notification reply transmitted by the handover controller 37 in S408 also includes the "command identifier" and the "terminal identifier", as indicated by the command C4. The handover controller 37 sets, in the command C4, an identifier indicating an authentication-information-notification reply as the "command identifier" and the identifier indicating the communication terminal 1 as the "terminal identifier" and transmits the command C4 to the APC 4.

The handover controller 44 of the ARC 4 receives the command C4 via the communication device 42. The handover controller 44 verifies that the identifier as the "command identifier" in the command C4 indicates an authentication-information-notification reply. The handover controller 44 transmits a handover-request reply to the AP 3 via the communication device 42 (S409).

The format of the command for the handover-request reply transmitted by the handover controller 44 in S409 includes the "command identifier" and the "terminal identifier", as indicated by the command C4. The handover controller 44 sets, in the command C4, an identifier indicating a handover-request reply as the "command identifier" and the identifier indicating the communication terminal 1 as the "terminal identifier" and transmits the command C4 to the AP 3.

The handover controller 37 of the AP 3 receives the command C4 via the communication device 35. The handover controller 37 verifies that the identifier as the "command identifier" in the command C4 indicates a handover-request reply. The handover controller 37 transmits the handover-request reply to the communication terminal 1 via the millimeter-wave-communication device 33 (S410).

The handover-request reply transmitted by the handover controller 37 in S410 is the same as the handover-request reply received from the handover controller 44 in S409.

The handover controller 15 of the communication terminal 1 receives the command C4 via the millimeter-wave-communication device 12. The handover controller 15 verifies that the identifier as the "command identifier" in the command C4 indicates a handover-request reply and thereby judges that the handover is complete. The handover controller 15 of the communication terminal 1 connects the millimeter-wave-communication device 12 to the millimeter-wave-communication device 33 of the AP 3 and starts millimeter-wave communication. That is, the communication terminal 1 and the AP 3 are connected to each other.

The processes in the handover control in S411 to S414 after the communication terminal 1 and the AP 3 are connected to each other are the same as those in S309 to S312, respectively, in the handover control illustrated in FIG. 3.

In the case where the communication between the communication terminal 1 and the AP 2 is disconnected, upon receiving the visible-light data, the communication terminal 1 transmits the handover request to the ARC 4 via the AP 3 having transmitted the visible-light data under the handover control described above. When the communication terminal 1 receives the handover-request reply via the AP 3 having transmitted the visible-light data, the handover is complete.

According to the embodiment as described above, upon the visible-light data being received by the communication terminal from the AP, the AP having transmitted the visible-light data is identified as an AP to be newly connected, and handover to the newly connected AP is performed. With the configuration described above, the communication terminal can identify an AP ensuring a line-of-sight communication path without the need for searching (performing scanning) for the AP when performing handover and can set the identified AP as an AP to be newly connected by the handover. Accordingly, the embodiment enables handover to be performed quickly ensuring the line-of-sight communication path.

According to the embodiment, upon receiving the visible-light data from the AP, the communication terminal may transmit a handover request to an AP having transmitted the visible-light data. With the configuration described above, the communication terminal can transmit the handover request to the AP having transmitted the visible-light data, instead of an AP that is connected to the communication terminal. Accordingly, when the communication terminal disconnected the AP, the communication terminal can perform to handover quickly to an appropriate AP.

Note that the wireless LAN connection system using the millimeter-wave band has heretofore been described in the embodiment, but the present disclosure is not limited thereto. The configuration in which the handover control is performed between each of communication apparatuses performing wireless communication using the millimeter-wave band is not limited to the configuration used in the wireless LAN.

The example in which the millimeter-wave wireless-LAN connection system includes the two APs has heretofore been described in the embodiment, but the present disclosure is not limited thereto. The APs may number two or may number three or more.

The example in which the millimeter-wave wireless-LAN connection system includes the APs and the APC that are independent apparatuses has heretofore been described in the embodiment, but the present disclosure is not limited thereto. For example, the millimeter-wave wireless-LAN connection system may include a main AP that executes the function of the APC and a sub AP that is controlled by the main AP.

The following aspects of embodiments are included in the present disclosure.

A communication terminal according to a first aspect is a communication terminal includes the following elements. Visible-light reception circuitry, which in operation, receives visible-light data from a first communication apparatus. Handover control circuitry, which in operation, sets the first communication apparatus as a handover destination in accordance with the visible-light data. Millimeter-wave communication circuitry, which in operation, performs communication using a millimeter-wave band frequency with the first communication apparatus.

According to a second aspect; in the communication terminal of the first aspect, when the communication terminal is connected to a second communication apparatus after the visible-light reception circuitry receives the visible-light data, the handover control circuitry generates a handover request indicating a request for performing handover from the second communication apparatus to the first communication apparatus, and the millimeter-wave communication circuitry transmits the handover request to the second communication apparatus.

According to a third aspect, in the communication terminal of the first aspect, wherein when the communication terminal is not connected to a second communication apparatus after the visible-light receiver receives the visible-light data, the handover controller generates a handover request indicating a request for performing handover from the second communication apparatus to the first communication apparatus, and the millimeter-wave communication device transmits the handover request to the first communication apparatus.

According to a fourth aspect, in the communication terminal of the first aspect, the handover control circuitry extracts an identifier indicating the first communication apparatus from the visible-light data and sets the first communication apparatus as the handover destination.

According to a fifth aspect, in the communication terminal of the first aspect, when the visible-light reception circuitry receives the visible-light data, the handover control circuitry judges that line-of-sight communication using the millimeter-wave band frequency with the first communication apparatus is allowed.

A communication apparatus according to a sixth aspect is a communication apparatus includes the following elements. Visible-light transmittion circuitry, which in operation, transmits visible-light data. Handover control circuitry, which in operation, issues a connection instruction for establishing connection with a first communication terminal receiving the visible-light data. Millimeter-wave communication circuitry, which in operation, performs communication using a millimeter-wave band frequency with the first communication terminal in accordance with the connection instruction.

According to a second aspect, in the communication apparatus of the sixth aspect, when the handover control circuitry receives a handover request from a second communication terminal connecting with the communication apparatus, the handover control circuitry disconnects the second communication terminal.

According to a eighth aspect, in the wireless communication apparatus of the sixth aspect, when the handover control circuitry receives a handover request from the first communication terminal, the handover control circuitry establishes the connection with the first communication terminal.

According to a ninth aspect, in the communication apparatus of the sixth aspect, a communication range for the visible-light data is set approximately identical to a communication range of the communication using the millimeter-wave band frequency.

A communication system according to a tenth aspect is a communication system includes a plurality of communication apparatus; a communication terminal and a management device, The plurality of communication apparatus including a first communication apparatus and a second communication apparatus. The first communication apparatus includes the following elements. Visible-light transmittion circuitry, which in operation, transmits visible-light data. First handover control circuitry, which in operation, issues a connection instruction for establishing connection with the communication terminal receiving the visible-light data. First millimeter-wave communication circuitry, which in operation, performs communication using a millimeter-wave band frequency with the communication terminal in accordance with the connection instruction. The communication terminal includes the following elements. Visible-light reception circuitry, which in operation, receives the visible-light data from the first communication apparatus. Second handover control circuitry, which in operation, sets the first communication apparatus as a handover destination in accordance with the visible-light data. Second millimeter-wave communication circuitry, which in operation, performs the communication using the millimeter-wave band frequency with the first communication apparatus. The management device includes the following elements. Third handover control circuitry, which in operation, acquires authentication information for the communication terminal from the second communication apparatus connecting with the communication terminal and notifies the first communication apparatus of the authentication information.

According to a eleventh aspect, in the communication system of the tenth aspect, the third handover control circuitry receives a handover request from the first communication apparatus and transmits, to the first communication apparatus, a reply to the handover request.

According to a twelveth aspect, in the communication system of the eleventh aspect, when the handover request does not include the authentication information, the third handover control circuitry requests the second communication apparatus for the authentication information.

According to a thirteenth aspect, in the communication system of the eleventh aspect, a communication range for the visible-light data is set approximately identical to a communication range of the communication using the millimeter-wave band frequency.

According to a fourteenth aspect, in the communication system of the tenth aspect, when the visible-light reception circuitry receives the visible-light data, the second handover control circuitry judges that a line-of-sight communication path for the communication with the first communication apparatus is ensured.

The various embodiments have heretofore been described with reference to the drawings, but it goes without saying that the present disclosure is not limited to the embodiments. It will become apparent that those skilled in the art can conceive of various modifications and improvements made within the scope determined by the description of the scope of claims. It should be noted that the modifications and improvements are included in the technical scope of the present disclosure, as a matter of course. Any combination of the components in the embodiments may be made without departing from the spirit of the disclosure.

In the description of the embodiments, the configuration in which the present disclosure is implemented by using hardware is taken as an example. However, the present disclosure may also be implemented by software in combination with the hardware.

Each functional block used in the description of each embodiment described above can be partly or entirely realized by a large scale integration (LSI) such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, or a general-purpose processor, or a special-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Further, in a case where the progress of the semiconductor technique or another derivative technique leads to an integrated circuit technique replacing LSI, the functional blocks may naturally be integrated by using the technique. A biological technique or another technique is likely to be applicable to the integration.

The present disclosure is useful for a millimeter-wave wireless-LAN connection system.

What is claimed is:
1. A communication terminal comprising:
visible-light reception circuitry, which in operation, receives visible-light data from a first communication apparatus;
handover control circuitry, which in operation, sets the first communication apparatus as a handover destination in accordance with the visible-light data; and millimeter-wave communication circuitry, which in operation; performs communication using a millimeter-wave band frequency with the first communication apparatus.

2. The communication terminal according to claim 1, wherein when the communication terminal is connected to a second communication apparatus after the visible-light reception circuitry receives the visible-light data; the handover control circuitry generates a handover request indicating a request for performing handover from the second communication apparatus to the first communication apparatus, and
the millimeter-wave communication circuitry transmits the handover request to the second communication apparatus.

3. The communication terminal according to claim 1, wherein when the communication terminal is not connected to a second communication apparatus after the visible-light receiver receives the visible-light data,
the handover controller generates a handover request indicating a request for performing handover from the second communication apparatus to the first communication apparatus, and
the millimeter-wave communication device transmits the handover request to the first communication apparatus.

4. The communication terminal according to claim 1, wherein the handover control circuitry extracts an identifier indicating the first communication apparatus from the visible-light data and sets the first communication apparatus as the handover destination.

5. The communication terminal according to claim 1, wherein when the visible-light reception circuitry receives the visible-light data, the handover control circuitry judges that line-of-sight communication using the millimeter-wave band frequency with the first communication apparatus is allowed.

6. A communication apparatus comprising:
visible-light transmittion circuitry, which in operation, transmits visible-light data;
handover control circuitry, which in operation, issues a connection instruction for establishing connection with a first communication terminal receiving the visible-light data; and
millimeter-wave communication circuitry, which in operation, performs communication using a millimeter-wave band frequency with the first communication terminal in accordance with the connection instruction.

7. The communication apparatus according to claim 6, wherein when the handover control circuitry receives a handover request from a second communication terminal connecting with the communication apparatus, the handover control circuitry disconnects the second communication terminal.

8. The communication apparatus according to claim 6, wherein when the handover control circuitry receives a handover request from the first communication terminal, the handover control circuitry establishes the connection with the first communication terminal.

9. The communication apparatus according to claim 6, wherein a communication range for the visible-light data is set approximately identical to a communication range of the communication using the millimeter-wave band frequency.

10. A communication system comprising:
a plurality of communication apparatus;
a communication terminal; and
a management device,
the plurality of communication apparatus including a first communication apparatus and a second communication apparatus, and the first communication apparatus comprising:
visible-light transmittion circuitry, which in operation; transmits visible-light data;
first handover control circuitry, which in operation, issues a connection instruction for establishing connection with the communication terminal receiving the visible-light data; and
first millimeter-wave communication circuitry, which in operation, performs communication using a millimeter-wave band frequency with the communication terminal in accordance with the connection instruction,
the communication terminal comprising:
visible-light reception circuitry, which in operation, receives the visible-light data from the first communication apparatus;
second handover control circuitry, which in operation, sets the first communication apparatus as a handover destination in accordance with the visible-light data; and
second millimeter-wave communication circuitry, which in operation, performs the communication using the millimeter-wave band frequency with the first communication apparatus,
the management device comprising:
third handover control circuitry, which in operation, acquires authentication information for the communication terminal from the second communication apparatus connecting with the communication terminal and notifies the first communication apparatus of the authentication information.

11. The communication system according to claim 10, wherein the third handover control circuitry receives a handover request from the first communication apparatus and transmits, to the first communication apparatus, a reply to the handover request.

12. The communication system according to claim 10, wherein a communication range for the visible-light data is set approximately identical to a communication range of the communication using the millimeter-wave band frequency.

13. The communication system according to claim 10, wherein when the visible-light reception circuitry receives the visible-light data, the second handover control circuitry judges that a line-of-sight communication path for the communication with the first communication apparatus is ensured.

14. The communication system according to claim 11, wherein when the handover request does not include the authentication information, the third handover control circuitry requests the second communication apparatus for the authentication information.

* * * * *